United States Patent Office 3,172,286
Patented Mar. 9, 1965

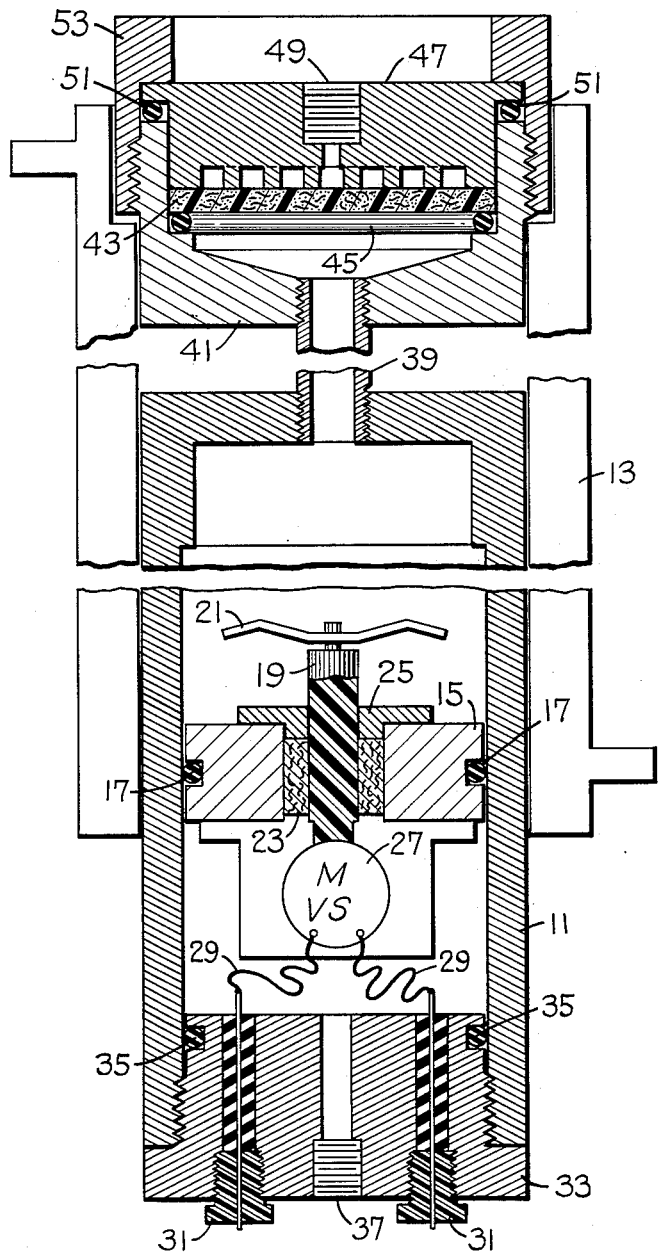

3,172,286
METHOD AND APPARATUS FOR TESTING FRACTURING AND RELATED FLUIDS
William E. Grubb, and John S. Cave, Dallas, Tex., assignors to The Atlantic Refining Company, Philadelphia, Pa., a corporation of Pennsylvania
Filed Mar. 20, 1961, Ser. No. 97,021
5 Claims. (Cl. 73—53)

This invention is concerned with improved apparatus and methods for testing the properties of fracturing fluids, drilling fluids, workover fluids and related fluids.

In crude oil production, frequently fluid-loss additives or filter cake forming additives are mixed with well treating fluids, drilling fluids and workover fluids to control fluid leak-off to the formation. One method of testing the effectiveness of these additives is to subject the fluid to pressure filtration through a porous medium and measure the quantity of fluid passing through the porous medium in given time intervals.

Present equipment employed in this filter testing generally consists of a gas pressurized cylinder. The lower end of this cylinder has an outlet which is covered by a porous medium. The fluid to be tested is placed over the porous medium and gas pressure is imposed directly on the fluid. In some instances, there is provided a means for heating the fluid. These testers have many inherent faults. In prior art testers, for example, the additives or fluids, can separate and settle out onto the porous medium and change the properties of the system. Moreover, the temperature of the test fluids is not uniform throughout. There are voids below the porous medium which collect filtrate thereby decreasing the accuracy of the test. The gas used to pressurize the test fluids may dissolve in, contaminate and change the flow properties of the test fluid. The tester can unload itself quickly, thereby subjecting operators to the hazards of escaping gas pressures.

Accordingly, it is the object of this invention to provide improved methods and fluid testers designed for pressure filtration testing of fracturing fluids, drilling fluids, workover fluids and related fluids whereby most of the faults of prior art testers are eliminated.

Another object of this invention is to provide a fluid tester that can be operated in any position.

Yet another object of this invention is to provide means and methods for maintaining the uniformity of properties of the test fluid mixture.

Still another object of this invention is to provide a movable piston with built-in stirrer to apply the force necessary to pressurize the test fluids.

A further object of this invention is to provide a gas or liquid pressurized fluid-loss tester wherein the gas or liquid is kept separate from the test fluid and the gas is confined to a predetermined volume.

Yet a further object of this invention is to provide a gas-driven piston with built-in stirrer wherein the pressure drop between the blade portion of the stirrer and the motor portion is kept at a minimum, thereby minimizing the difficulty of sealing a rotating shaft.

Still a further object of this invention is to provide a method of testing the fluid-loss properties of a test fluid under conditions more closely simulating actual well conditions.

Another object of this invention is to provide an improved fluid-loss testing method wherein the volume of filtrate is more accurately measured.

Other advantages and objects of this invention will become apparent by reference to the accompanying drawings, appended claims, and following specification, and it is understood that such drawings and specification are merely illustrative of this invention and such disclosure within the scope of the claims is adaptable to other fluid-loss testing devices.

In the drawing, there is shown a fragmented, elevational, cross-sectional view of the fluid tester as provided herein.

In general, this invention provides an improved fluid tester capable of being operated in any position. The improved tester has a movable piston adapted to pressurize a test fluid in a test cell. Mounted on and movable with the piston is a stirrer with its blade extending into the test fluid. At the other end of the tester, that is, the fluid end, there is a porous medium. Surrounding the test fluid is a means for heating the test fluid.

More specifically, referring now to the drawing, there is shown one embodiment of this invention wherein the tester is pressurized by gas and placed in a vertical position with the porous medium above the liquid. The improved tester as shown comprises elongated, cylindrical test cell 11 surrounded by heating means 13 which can be any suitable form of heating arrangement. For illustrative purposes, heating means 13 is shown as a hot fluid (gas or liquid) jacket; however, heating means 13 could be an insulated electrical heating coil, a heating bath enclosing the entire test unit or any other suitable form of heating means.

Mounted inside of test cell 11 is movable piston 15 which is movable to traverse substantially the entire length of test cell 11. One side of piston 15 contacts the test fluid and the other side of piston 15 contacts the drive gas. Mounted around piston 15 is O-ring 17 which acts as a seal between piston 15 and test cell 11. Piston 15 could be liquid-driven or mechanically operated or motor-driven. For example, piston 15 could have a threaded cylindrical shaft which would be rotated to give the force necessary to apply the pressure to the test fluids. This piston arrangement would be especially useful for pressures higher than those available with gas or liquid; however, in most instances, the piston will be gas-driven since better pressure control can be maintained by gas drive.

Mounted through and movable with piston 15 is stirrer 19. Blade 21 of stirrer 19 extends into the test fluid mixture. The rotating shaft of stirrer 19 is sealed by packing 23 which is held in place and compressed by retaining ring 25. Piston 15 and stirrer 19 can be made of any suitable strength material chemically resistant to the test fluids.

Stirrer 19 will usually be operated by variable speed motor 27 which can be either D.C. or A.C. driven; however, any suitable drive means could be used. Motor 27 of stirrer 19 is mounted on the gas side of piston 15 with electrical connections 29 extending out of one end of test cell 11 through pressure tight seals 31. Pressure tight seals 31 are contained in plug 33 which screws into one end of test cell 11 and is sealed by O-ring 35. Extending through plug 33 is bore 37 which communicates with the interior of test cell 11. Bore 37 acts as an inlet for gas pressure from a gas container (not shown) which gas pressure is used to pressurize the volume between piston 15 and plug 33 in test cell 11. As shown, motor 27 and stirrer blade 21 are exposed to the same pressure; therefore, the pressure drop across piston 15 around the shaft of stirrer 19 is minimized. This is the preferred arrangement of stirrer 19 and piston 15 when test cell 11 is pressurized by gas since this eliminates difficulties in sealing a rotating shaft under pressure.

As shown, stirrer blade 21 is a typical blade perpendicular to the longitudinal axis of test cell 11. However, stirrer blade 21 could be any type of stirrer blade suitable for this invention.

Screwed into the fluid end of test cell 11 is hollow cylindrical rod 39 which is also screwed into the lower end of porous medium holder 41. Hollow cylindrical rod 39, therefore, acts as a communication passage between test cell 11 and the inside of porous medium holder 41. Holder 41 contains porous medium 43. Porous medium 43 can be any suitable form of filter or porous material, e.g., either a controlled permeability synthetic sandstone disc, a core disc, a filter paper, multilayers of filter paper, filter paper between sintered metal discs and the like. As illustrated, the porous medium is made of a controlled permeability synthetic sandstone disc. The edges of porous medium 43 on the fluid side of the porous medium are sealed by seal ring 45. The filtrate side of porous medium 43, or the upper side thereof, is supported by grooved base 47. The grooves of grooved base 47 connect to a central flow passage 49 which communicates with any suitable means for testing the volume of fluid passing through porous medium 43. Grooved base 47 is sealed by seal ring 51 and held in place by retainer ring 53 which screws into porous medium holder 41. In some instances, especially where there might be a pressure drop across hollow cylindrical rod 39, it may be desirable to make porous medium holder 41 an integral part of the end of test cell 11 thereby eliminating hollow cylindrical rod 39.

The fluid tester can be operated in any position, but preferably the tester will be operated in the vertical position with the porous medium above the test fluid and piston; therefore, the following description of the operation of the tester will be directed to this vertical position.

As stated previously, piston 15 can be mechanically operated, gas-driven or liquid-driven. But, under most conditions the gas drive method is preferred over mechanical or liquid drive since gas drive is easier to control; consequently, the following description of the tester will also be directed to gas drive.

In operation, motor 27 is connected to electrical connections 29, and piston 15 is inserted into the lower end of test cell 11. Thereafter, plug 33 is screwed into the end of test cell 11 and a gas pressurizing means connected to bore 37. If porous medium holder 41 is made an integral part of test cell 11 and test cell 11 is formed with a uniform bore size throughout, the piston can be lowered into test cell 11 and plug 33 can be installed first.

Stirrer 19 is started and adjusted to the proper speed. The proper speed for stirrer 19 depends upon the dimensions of the tester and the type of test fluid, which largely depends on the nature of the solids, the thixotropic characteristics of the fluid, the viscosity of the fluid, the temperature and other related properties.

The volume above piston 15 in test cell 11 is filled with the liquid to be tested by pouring the liquid into porous medium holder 41 and through rod 39. The amount of liquid can be varied by varying the position of piston 15 and the dimensions of the tester. After placing the desired amount of test fluid into the tester, porous medium 43 is positioned on seal ring 45 in porous medium holder 41. Porous medium 43 is followed by grooved base 47 which backs up porous medium 43 thereby preventing fracture of the medium when a pressure differential is created across it. Grooved base 47 also provides flow channels for the filtrate. Grooved base 47 is locked into position by retainer ring 53.

Flow passage 49 is then connected to a system for measuring the volume of filtrate passing through porous medium 43. Since the apparatus is placed in the vertical position with the porous medium above the test fluid, flow passage 49 and the grooves in grooved base 47 can be filled with a suitable liquid. Preferably, the liquid will be same as the filtrate. Since these volumes are filled and remain filled throughout the test, any and all filtrate passing through porous medium 43 must displace an equal volume of fluid into the volume measuring system.

The outlet (not shown) to the volume measuring system is closed and that portion of test cell 11 below piston 15 is pressurized with gas to the desired pressure. The test fluid is heated by heating means 13 until the desired temperature is reached. Since the filter medium is above the test fluid, natural convection of the heat will be upward against the porous medium thereby providing more accurate control of the upper temperature limits of the test fluid at the porous medium.

The outlet to the volume measuring system is opened and the amount of fluid filtrate passing through porous medium 43 per unit of time is measured. During the test should fluid loss additives, or solids suspended in the test fluid or the fluids themselves, tend to separate from and settle out of the test fluid mixture, they will settle to the stirrer. The stirrer will return the sediment back to the test mixture thereby maintaining uniformity of the test fluid mixture. If the tester were operated in a different position, the efficiency of the stirrer to return any sediment to the test mixture would be decreased.

As noted previously, the test fluids may be heated by heating means 13. Frequently, this temperature is high enough to cause vaporization of the filtrate at atmospheric pressure. If part of the filtrate evaporates, the accuracy of the test is decreased. Under such conditions, either the filtrate will be maintained at a pressure exceeding the vapor pressure of the filtrate until the filtrate cools; or the filtrate will be cooled by a heat exchanger before it is exposed to the atmosphere.

The foregoing description of this invention has described certain modifications thereto, but it is understood that all the modifications have not been described and that further modifications can be suggested by those skilled in the art. This invention intends to cover such modifications as fall within the scope of the appended claims.

We claim:

1. Apparatus for pressure filtration testing of fluids comprising an elongated test cell adapted to receive the fluid to be tested, holder means containing a porous medium, said holder means mounted adjacent one end of said cell and in open communication therewith, piston means mounted in said cell and adapted to traverse substantially the entire length of said cell and pressurize said test fluid against said porous medium, stirring means rotatably mounted on said piston so as to move through said cell with said piston, said stirring means projecting from said piston into said test fluid in said cell, and means for rotating said stirring means.

2. The apparatus of claim 1 wherein the means for rotating the stirring means is an electric motor.

3. The apparatus of claim 2 wherein the electric motor is fixedly attached to that side of the piston opposite to side carrying the stirrer means.

4. The apparatus of claim 2 wherein the electric motor is variable speed.

5. A method of pressure filtration for testing fracturing, drilling, workover and related fluids, which comprises placing a porous medium above the fluids to be tested, pressurizing said fluids upward against said porous medium, agitating said fluids during the test in a manner that returns any sediment settling out of said fluids to said fluids, and measuring the volume of said fluids passing through said porous medium at selected time intervals.

References Cited in the file of this patent

UNITED STATES PATENTS

| | | |
|---|---|---|
| 2,733,595 | Twining | Feb. 7, 1956 |
| 2,767,574 | Schurch | Oct. 23, 1956 |
| 2,966,055 | Tracht et al. | Dec. 27, 1960 |
| 3,055,208 | Gallus | Sept. 25, 1962 |

FOREIGN PATENTS

| | | |
|---|---|---|
| 2,124 | Great Britain | Jan. 18, 1874 |